United States Patent
Deandrade et al.

(10) Patent No.: US 12,535,105 B2
(45) Date of Patent: Jan. 27, 2026

(54) DEVICE FOR CONTROLLING A MAGNETIC BEARING AND ASSOCIATED SYSTEM

(71) Applicant: SKF Magnetic Mechatronics, Saint-Marcel (FR)

(72) Inventors: Andre Deandrade, Vernon (FR); Lakdar Sadi-Haddad, Nogent sur Marne (FR)

(73) Assignee: SKF Magnetic Mechatronics, Saint-Marcel (FR)

( * ) Notice: Subject to any disclaimer, the term of this patent is extended or adjusted under 35 U.S.C. 154(b) by 246 days.

(21) Appl. No.: 18/462,094

(22) Filed: Sep. 6, 2023

(65) Prior Publication Data

US 2024/0093729 A1 Mar. 21, 2024

(30) Foreign Application Priority Data

Sep. 15, 2022 (EP) ..................................... 22315212

(51) Int. Cl.
*F16C 32/04* (2006.01)
*F16C 37/00* (2006.01)

(52) U.S. Cl.
CPC ...... *F16C 32/0446* (2013.01); *F16C 32/0459* (2013.01); *F16C 37/005* (2013.01)

(58) Field of Classification Search
CPC .............. F16C 32/0446; F16C 32/0459; F16C 37/005; F16C 32/0453; F16C 32/0451
See application file for complete search history.

(56) References Cited

U.S. PATENT DOCUMENTS

| 5,708,312 A | 1/1998 | Rosen et al. |
| 5,969,451 A * | 10/1999 | Lyons ..................... F16C 39/06 310/90 |
| 2009/0265038 A1 | 10/2009 | Ramsey et al. |

FOREIGN PATENT DOCUMENTS

| EP | 0848174 A2 | 6/1998 |
| JP | 2019165054 A | 9/2019 |

OTHER PUBLICATIONS

JP2019165054A English translation (Year: 2025).*
Extended European Search Report of the European Patent Office in Application No. 22315212.5, dated Feb. 20, 2023; 5pgs.

* cited by examiner

Primary Examiner — Christopher M Koehler
Assistant Examiner — Viswanathan Subramanian
(74) *Attorney, Agent, or Firm* — Stinson LLP

(57) ABSTRACT

A device (24) for controlling a magnetic bearing (22) includes an axis with two electromagnets (26, 28) diametrically opposed. The device (24) includes two power converters per axis of the magnetic bearing. Each power converter supplies one different electromagnet. The device includes eight power devices (40, 42, 44, 46, 48, 50, 52, 54) arranged in a first line (88) and a second line (90). Each of the first and second lines includes four power devices. A first set of four power devices (40, 42, 44, 46) are connected together to form a first power converter. A second set of four power devices (48, 50, 52, 54) are connected together to form a second power converter. Each of the first and second lines (88, 90) includes two power devices (40, 42, 44, 46) of the first set and two power devices (48, 50, 52, 54) of the second set.

18 Claims, 2 Drawing Sheets

DEVICE FOR CONTROLLING A MAGNETIC BEARING AND ASSOCIATED SYSTEM

CROSS-REFERENCE TO RELATED APPLICATION

This application claims priority to European Application No. 22315212.5, filed Sep. 15, 2022, the entirety of which is hereby incorporated by reference.

FIELD

The present disclosure is directed to a device for controlling a magnetic bearing and a system comprising a magnetic bearing supplied by the said device.

BACKGROUND

Active magnetic bearing comprises a stator comprising electromagnets controlled to keep a rotor in the center of the stator.

The active magnetic bearing comprises at least one axis including two electromagnets diametrically opposed in the stator and supplied by a first and a second power converters controlled by a position controller to maintain the rotor in levitation in the center of the stator.

The position controller generates a control current to control both power controllers.

When a disturbance force appears on the rotor, for example gravity, the electromagnet opposite to the direction of the disturbance must exert a restoring force.

A bias current is added (addition or subtraction) to the control current of the power controller supplying the electromagnet magnet opposite to the direction of the disturbance to maintain equilibrium position of rotor.

When the bias current is added to the control current, the said power controller supplies the said electromagnet with a higher current so that the said power controller generates more heat than the other power controller.

Generally, the first and a second power converters comprise power devices encapsulated in a power supply chip.

FIG. 1 represents an embodiment of a power supply chip 1 comprising a first power controller 6 including power devices 2 to 5 and a second power controller 10 including power devices 7 to 10.

The power devices of 2 to 5, 7 to 10 of each power controller 6, 11 are arranged in line on a side of the chip 1.

When the bias current is added to the control current of the first power controller 6, the power devices of 2 to 5 of the first power controller 6 paced next to each other generate a surplus of heat compared to the power devices of 7 to 10 of the second power controller 11 paced next to each other.

The generated surplus of heat is dissipated by coolers of the chip 1.

As the dissipated surplus of heat is concentrated on a single side of the chip 1, the coolers are design to the dissipated the surplus of heat concentrated on a single side of the chip 1.

An important surface of the chip 1 is needed to implemented coolers increasing the size of the chip 1.

Consequently, the present disclosure intends to overcome these disadvantages by providing a thermally optimized chip.

SUMMARY

According to an aspect, a device for controlling a magnetic bearing is proposed.

The magnetic bearing comprises at least an axis including first and second electromagnets diametrically opposed.

The device comprises two power converters per axis of the magnetic bearing, each power converter being configured to supply one different electromagnet of the first and second electromagnets, the device comprising at least eight power devices disposed on a support of the device, the eight power devices being arranged in a first line and a second line, the first line and a second line being parallel, each of the first and second lines comprising at least four power devices, a first set of four power devices of the said at least eight power devices being connected together to form a first power converter, and a second set of four power devices of the said at least eight power devices being connected together to form a second power converter, Each of the first and second lines comprises two power devices of the first set and two power devices of the second set, the four power devices of the first and second lines being arranged so that two adjacent power devices belong to different sets and so that the power devices at the extremities of the first line belong to a different set than power devices at the extremities of the second line.

The power devices of the first and second power converts are arranged so that the adjacent power devices of a power device of the first power converter belong to the second power converter.

The generated surplus of heat dissipated by one of the power converters is diffused on the full surface of the device and not concentrated on an area of the surface of the support, reducing the encumbrance of the device.

Preferably, the connection between the power devices of the first set arranged in the first line and the power devices of the first set arranged in the second line crosses the connection between the power devices of the second set arranged in the first line and the power devices of the second set arranged in the second line.

Advantageously, the support of the device comprises coolers, each power devices being disposed on a cooler.

Preferably, each pair of power devices of the first and second sets form a switching cell of the first and second power converters, the first power device and the second power device of each switching cell comprising a commanded power switch and a diode in parallel with the commanded power switch.

Advantageously, each pair of power devices of the first and second sets form a switching cell of the first and second power converters, a first power device of each switching cell comprising a commanded power switch and a diode in parallel with the commanded power switch and the second power devices of each switching cell comprising a passive power switch.

Preferably, the passive power switch comprises a power diode.

Advantageously, the commanded power switch comprises a transistor.

According to another aspect, a system for controlling a magnetic bearing comprising at least an axis is proposed.

The at least one axis includes first and second electromagnets diametrically opposed and a device as defined above, the first power converter supplying the first electromagnet and the second power converter supplying the second electromagnet.

Advantageously, the system further comprises at least one sensor to measure the position of a rotor of the magnetic bearing compared to the first and second electromagnets.

Preferably, the system further comprises a processing unit configured to control commanded power switches of the first and second power converters to supply the electromagnets from measurements delivered the sensor.

BRIEF DESCRIPTION OF THE DRAWINGS

The present disclosure and its advantages will be better understood by studying the detailed description of specific embodiments given by way of non-limiting examples and illustrated by the appended drawings on which.

DETAILED DESCRIPTION

Figure 1:
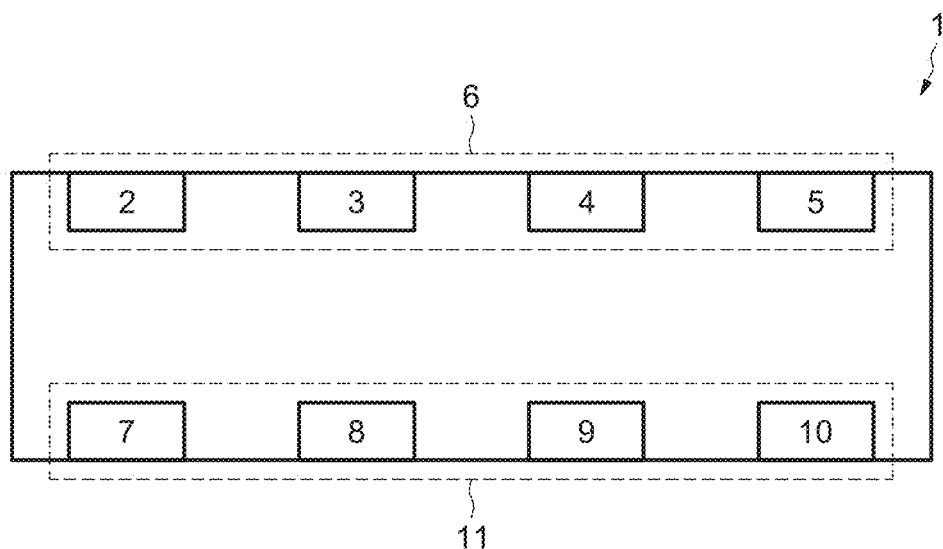
FIG. 1 which has already been mentioned previously, illustrates a power supply chip according to the prior art.
Figure 2:
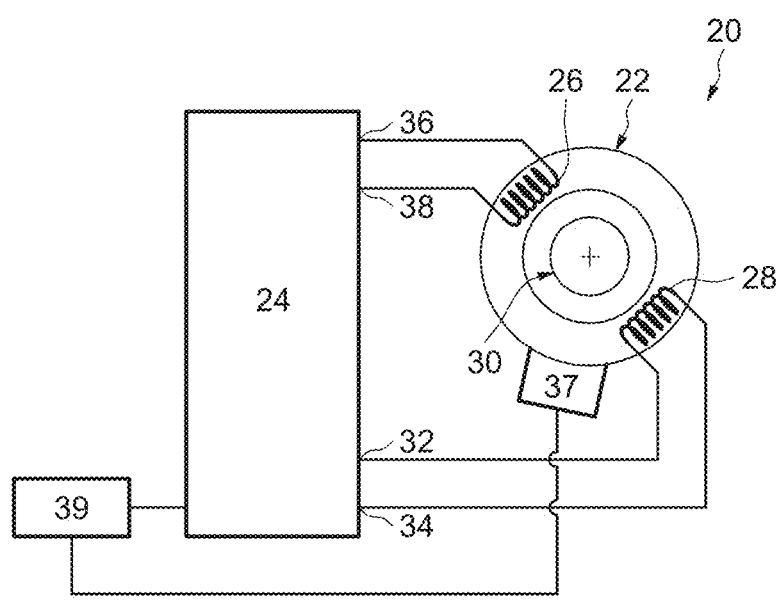
FIG. 2 illustrates schematically an example of a system for controlling a magnetic bearing according to the present disclosure.

Reference is made to FIG. 2 which represents an example of a system 20 for controlling a magnetic bearing, comprising a magnetic bearing 22 and a device 24 for controlling the magnetic bearing 22.

The magnetic bearing 22 comprises an axis including two electromagnets 26, 28 diametrically opposed.

A rotor 30 is inserted in the magnetic bearing 22 between the two electromagnets 26, 28.

The device 24 controls the two electromagnets 26, 28 so that the rotor 30 levitates in a centered position of the magnetic bearing 22.

A first electromagnet 26 is connected to a first output 36 and a second output 38 of the device 24, and a second electromagnet 28 is connected to a third output 32 and a fourth output 34 of the device.

The system 20 further comprises a processing unit 39 controlling the device 24.

The system 20 comprises a sensor 37 connected to the processing unit 39 and delivering the position of the rotor 30 compared to the two electromagnets 26, 28.

Figure 3:
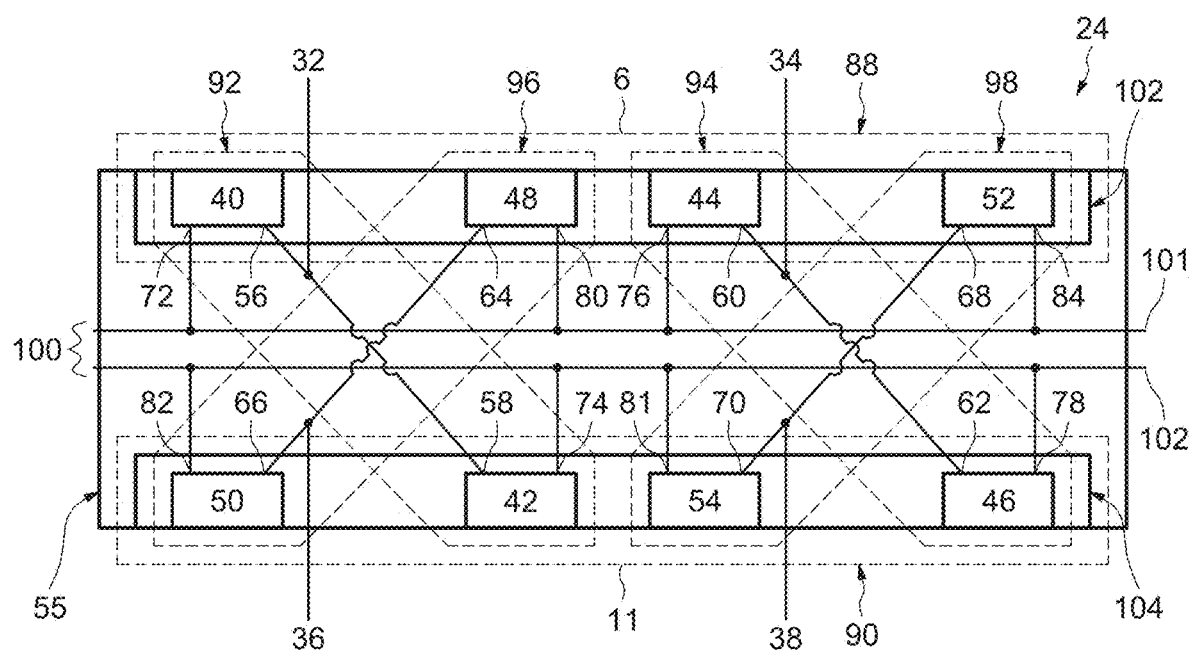
FIG. 3 illustrates schematically an example of a device for controlling a magnetic bearing according to the present disclosure.

FIG. 3 illustrates an example of the device 24.

The device 24 comprises eight power devices 40, 42, 44, 46, 48, 50, 52, 54 disposed on a support 55 of the device 24.

Each power device 40, 42, 44, 46, 48, 50, 52, 54 comprises a first connection 56, 58, 60, 62, 64, 66, 68, 70 and a second connection 72, 74, 76, 78, 80, 81, 82, 84.

The eight power devices 40, 42, 44, 46, 48, 50, 52, 54 are arranged in a first line 88 and a second line 90 parallel to the first line 88.

The first line 88 may be arranged on a first side of the support 55 and the second line 90 may be arranged on a second side of the support 55.

Each line 88, 90 comprises four power devices.

A first set of four power devices 40, 42, 44, 46 are connected together to form two switching cells or legs 92, 94.

The first connections 56, 58 of a first and second power devices 40, 42 are connected together to form a first switching cell 92 and the first connections 60, 62 of a third and a fourth power devices 44, 46 are connected together to form a second switching cell 94.

The two switching cells 92, 94 are connected together to form a first power converter.

A second set of four power devices 48, 50, 52, 54 are connected together to form two switching cells 96, 98.

The first connections 64, 66 of a fifth and a sixth power devices 48, 50 are connected together to form a third switching cells 96 and the first connections 68, 70 of a seventh and an eighth power devices 52, 54 are connected together to form a fourth switching cells 98.

The third and fourth switching cells 96, 98 are connected together to form a second power converter.

In another embodiment, each of the first and second power converters may comprise more than four power devices implemented to form a multilevel power converter.

The first output 32 of the device 24 is connected to the first switching cell 92 between the first and second power devices 40, 42, and the second output 34 of the device 24 is connected to the second switching cell 94 between the third and fourth power devices 44, 46 so that the first power converter supplies the second electromagnet 28.

The third output 36 of the device 24 is connected to the third switching cell 96 between the fifth and sixth power devices 48, 50 and the fourth output 38 of the device 24 is connected to the fourth switching cell 98 between the seventh and eighth power devices 52, 54 so that the second power converter supplies the first electromagnet 26.

The second connection 72, 74, 76, 78, 80, 81, 82, 84 of each power device 40, 42, 44, 46, 48, 50, 52, 54 is connected to a power supply bus 100 of the device 24 supplying the device 24 with electrical energy.

The second connection 72, 76, 80, 84 of each power device 40, 44, 48, 52 is connected to a first supply bar 101 of the supply bus 100 supplying a negative potential.

The second connection 74, 78, 81, 82 of each power device 40, 42, 46, 50, 54 is connected to a second supply bar 102 of the supply bus 100 supplying a positive potential.

The first and second power converters convert electrical energy supplied by the power supply bus 100 to supply the first and second electromagnets 26, 28 with power.

The first line 88 comprises the first and third power devices 40, 44 of the first set and the fifth and seventh power devices 48, 52 of the second set, and the second line 90 comprises the second and fourth power devices 42, 46 of the first set and the sixth and eighth power devices 50, 54 of the second set.

The four power devices of the first and second lines 88, 90 are arranged so that two adjacent power devices belong to two different sets and so that the power devices 40, 52 at the extremities of the first line 88 belong to a different set of four power devices than the power devices 50, 46 at the extremities of the second line 90.

The power devices 40, 42, 44, 46, 48, 50, 52, 54 of the first and second power converts are arranged so that the adjacent power devices of a power device 40, 42, 44, 46 of the first power converter belong to the second power converter.

When one of the first and second power converters is more in demand, the generated surplus of heat dissipated by the said power converter is diffused on the full surface of the support 55 of the device 24 and not concentrated on an area of the surface of the support 55.

The power devices 40, 42, 44, 46, 48, 50, 52, 54 may be implemented on coolers 102, 104 of the device 24 lying on the support 55.

As the generated surplus of heat is dissipated on the full surface of the support 55, the size of the coolers 102, 104 is reduced so that the encumbrance of the device 24 is reduced.

The thermal mapping of the device 24 is homogenize.

As represented on FIG. 3, the connection between a power device 40, 44 of the first set arranged in the first line 88 and a power device 42, 46 of the first set arranged in the second line 90 crosses the connection between a power device 48, 52 of the second set arranged in the first line 88 and a power device 50, 54 of the second set arranged in the second line 104.

This arrangement of the power devices 40, 42, 44, 46, 48, 50, 52, 54 permits to minimize the routing of the connexions between the power devices comprising for example leads made of cooper reducing even more the encumbrance of the device 24.

The magnetic bearing 22 may comprise more than one axis, each axis comprising two electromagnets diametrically opposed, each electromagnet being supplied by a different power converter of the device 24.

The device 24 comprises two power converters per axis of the magnetic bearing 22 supplying a different electromagnet of the said axis.

Figure 4:
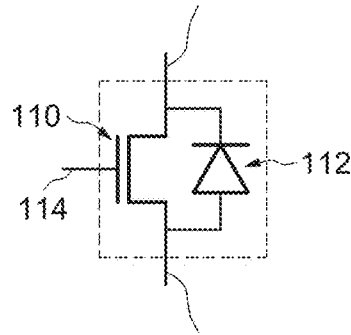
FIG. 4 illustrates schematically a first embodiment of the power devices according to the present disclosure.

FIG. 4 illustrates schematically a first embodiment of the power devices 40, 42, 44, 46, 48, 50, 52, 54.

The power device comprises a commanded power switch 110 and a diode 112 in parallel with the commanded power switch 110.

The commanded power switch 110 comprises for example a field effect transistor comprising a gate connected to a third connection 114 of the power device 40, 42, 44, 46, 48, 50, 52, 54, a drain connected to the first connection 56, 60, 64, 68 and the second connection 74, 78, 81, 82 of the power devices 40, 44, 48, 52, and a source connected to the first connection 58, 62, 66, 70 and the second connection 72, 76, 80, 84 of the power devices 40, 44, 48, 52.

The anode of the diode 112 is connected to the source of the transistor 110 and the cathode of the diode 112 is connected to the drain of the transistor 110.

The processing unit 39 controls the commanded power switch 110 to supply the electromagnets 26, 28 from measurements delivered the sensor 40.

The processing unit 39 is connected to third connection 114 of the power device 40, 42, 44, 46, 48, 50, 52, 54 to control the gate of the transistor 110.

Figure 5:
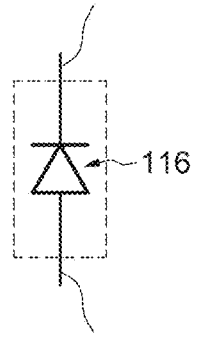
FIG. 5 illustrates schematically a second embodiment of the power devices according to the present disclosure.

FIG. 5 illustrates a second embodiment of the power devices 40, 46, 48, 54.

Each power device 40, 46, 48, 54 comprises a passive power switch 116 comprising for example a power diode, the cathode of the power diode 116 being connected to the first connection 56, 64 of the power devices 40, 48 and to the second connection 78, 81 of the power devices 46, 54, and the anode of the power diode 116 being connected to the first connection 62, 70 of the power devices 46, 54 and to the second connection 72, 80 of the power devices 40, 48.

The power devices 42, 44, 50, 52 are identical and connected as described in the first embodiment of the power devices 42, 44, 50, 52 as illustrated on FIG. 4.

What is claimed is:

1. A device for controlling a magnetic bearing having an axis and first and second electromagnets diametrically opposed along the axis, the device comprising:
   a support;
   two power converters for the magnetic bearing, each power converter being configured to supply one electromagnet of the first and second electromagnets;
   at least eight power devices disposed on the support, the eight power devices being arranged in a first line and a second line, the first line and a second line being parallel, each of the first and second lines comprising at least four power devices, a first set of four power devices of the said at least eight power devices being connected together to form a first power converter of the two power converters, and a second set of four power devices of the said at least eight power devices being connected together to form a second power converter of the two power converters, each of the first and second lines comprise two power devices of the first set and two power devices of the second set, the four power devices of the first and second lines being arranged so that two adjacent power devices belong to different sets and so that the power devices at the extremities of the first line belong to a different set than power devices at the extremities of the second line.

2. The device according to claim 1, wherein the connection between the power devices of the first set arranged in the first line and the power devices of the first set arranged in the second line crosses the connection between the power devices of the second set arranged in the first line and the power devices of the second set arranged in the second line.

3. The device according to claim 2, wherein the support of the device comprises coolers, each power device being disposed on one of the coolers.

4. The device according to claim 3, wherein each pair of power devices of the first and second sets form a switching cell of the first and second power converters, the first power device and the second power device of each switching cell comprising each a commanded power switch and a diode in parallel with the commanded power switch.

5. The device according to claim 3, wherein each pair of power devices of the first and second sets form a switching cell of the first and second power converters, a first power device of each switching cell comprising a commanded power switch and a diode in parallel with the commanded power switch and the second power devices of each switching cell comprising a passive power switch.

6. The device according to claim 5, wherein the passive power switch comprises a power diode.

7. The device according to claim 6, wherein the commanded power switch comprises a transistor.

8. The device according to claim 7, in combination with the magnetic bearing, the first power converter supplying the first electromagnet and the second power converter supplying the second electromagnet.

9. The device according to claim 8, further comprising at least one sensor to measure the position of a rotor of the magnetic bearing compared to the first and second electromagnets.

10. The device according to claim 9, further comprising a processing unit configured to control commanded power switches of the first and second power converters to supply the electromagnets from measurements delivered by the sensor.

11. The device according to claim 1, wherein the support of the device comprises coolers, each power device being disposed on one of the coolers.

12. The device according to claim 1, wherein each pair of power devices of the first and second sets form a switching cell of the first and second power converters, the first power device and the second power device of each switching cell comprising each a commanded power switch and a diode in parallel with the commanded power switch.

13. The device according to claim 12, wherein the commanded power switch comprises a transistor.

14. The device according to claim 1, wherein each pair of power devices of the first and second sets form a switching cell of the first and second power converters, a first power device of each switching cell comprising a commanded power switch and a diode in parallel with the commanded power switch and the second power devices of each switching cell comprising a passive power switch.

15. The device according to claim 14, wherein the passive power switch comprises a power diode.

16. The device according to claim 1, in combination with the magnetic bearing, the first power converter supplying the first electromagnet and the second power converter supplying the second electromagnet.

17. The device according to claim 16, further comprising at least one sensor to measure the position of a rotor of the magnetic bearing compared to the first and second electromagnets.

18. The device according to claim 17, further comprising a processing unit configured to control commanded power switches of the first and second power converters to supply the electromagnets from measurements delivered by the sensor.

* * * * *